United States Patent [19] [11] 3,883,562
Arpe et al. [45] May 13, 1975

[54] PROCESS FOR THE MANUFACTURE OF PIVALOLACTONE

[75] Inventors: Hans-Jürgen Arpe, Fischbach, Taunus, Germany; Lothar Heinz Hörnig, deceased, late of Frankfurt am Main, Germany, by Anneliese Hörnig, nee Münich, co-heiress

[73] Assignee: Hoechst Aktiengesellschaft, Frankfurt am Main, Germany

[22] Filed: Jan. 12, 1973

[21] Appl. No.: 323,253

Related U.S. Application Data

[63] Continuation of Ser. No. 34,640, May 4, 1970, abandoned.

[30] Foreign Application Priority Data

May 4, 1970 Germany.............................. 1923703

[52] U.S. Cl. ............................................. 260/343.9
[51] Int. Cl................................................ C07d 3/00
[58] Field of Search ................................. 260/343.9

[56] References Cited
UNITED STATES PATENTS
3,511,855  5/1970  Merger et al. ................... 260/343.9

OTHER PUBLICATIONS

Groggins; P. H., Unit Processes in Organic Synthesis, McGraw–Hill Book Co., Inc., 3rd Edition, 1947, New York, pp. 614–616 relied on.

*Primary Examiner*—Donald G. Daus
*Assistant Examiner*—Anne Marie T. Tighe
*Attorney, Agent, or Firm*—Curtis, Morris & Safford

[57] ABSTRACT

A process for the manufacture of pivalolactone from the anhydride of a β-acyloxypivalic acid or the mixed anhydride of a β-acyloxypivalic acid with a low aliphatic carboxylic acid with up to 5 carbon atoms by thermal splitting at temperatures within the range of from 150°C to 350°C on catalysts supported on carriers.

5 Claims, No Drawings

PROCESS FOR THE MANUFACTURE OF PIVALOLACTONE

This is a continuation of application Ser. No. 34,640, filed May 4, 1970 now abandoned.

The present invention relates to a process for the manufacture of pivalolactone.

The usual method of producing γ- and δ-lactones by splitting off water from the corresponding γ- or δ-hydroxycarboxylic acids is not applicable to the manufacture of pivalolactone (α,α-dimethyl-β-propiolactone) because the α,α-dimethyl-β-hydroxypropionic acid to be used as starting material for pivalolactone forms no lactone but low molecular weight polyesters and scission products due to the elimination of the bonds between the quaternary carbon atom and the neighboring carbon atoms.

Other methods have therefore been proposed for the manufacture of pivalolactone. These methods are generally only little selective or suffer from other disadvantages.

It has been proposed, for example, to make pivalolactone by dehydrohalogenation of α,α-dimethyl-β-halopropionic acid with bases such as sodium carbonate or lead oxide with loss of the halogen. It has also been proposed to produce pivalolactone by diazotization of α,α-dimethyl-β-amino-propionic acid in acetic acid. This process has the disadvantage that the manufacture of the β-aminocarboxylic acid is complicated.

Another process for the manufacture of pivalolactone consists in reacting hydroxypivalic acid (α,α-dimethyl-β-hydroxypropionic acid) with thionyl chloride in pyridine, whereby only small yields of lactone are obtained.

According to another prior proposal pivalolactone is obtained by reaction of dimethylketene with formaldehyde. The dimethylketene is, however, difficult to prepare and handle.

It is also possible to produce pivalolactone by thermolysis of β-acyloxypivalic acid on various metal oxides, metal phosphates, metal silicates or metal salts of carboxylic acids or on organic or inorganic metal salts in an inert high-boiling solvent. By both processes only unsatisfactory yields of lactone are obtained.

The present invention provides a process for the manufacture of pivalolactone which comprises reacting the anhydride of a β-acyloxypivalic acid of the general formula (1)

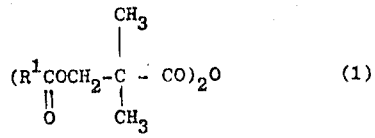

in which $R^1$ is hydrogen or a low alkyl group with up to 5 carbon atoms, or the mixed anhydride of a β-acyloxypivalic acid with a low aliphatic carboxylic acid of the general formula (2)

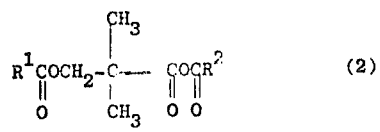

in which $R^1$ and $R^2$ have the meaning given above, at temperatures within the range of from 150°C to 350°C in the presence of a catalyst supported on a carrier.

It is surprising that it is not the β-acyloxypivalic acid itself but the anhydride of this acid which leads to improved yields in the thermal reaction for the manufacture of pivalolactone. This favorable effect of the anhydride of an acyloxypivalic acid is, however, only produced in the presence of other catalysts than those known for the thermolysis of acyloxy acids.

Catalysts supported on carriers such as, for example, α- and γ-alumina, silica gel, and amorphous or crystalline aluminum silicates may be used in the process of the invention. The catalysts are used in a grain size suitable for fluidized beds or fixed beds, for example within the range of from 0.07 to 0.3 millimeter, or in powdery form when they are used in inert high-boiling solvents. It is, however, advantageous, in order to obtain optimum yields of pivalolactone from an anhydride of a β-acyloxypivalic acid to use a specifically modified crystalline aluminum silicate as catalyst supported on a carrier. As crystalline aluminum silicates, molecular sieves which have a uniform pore size are preferably used. The molecular sieves may have a pore size below or above 5 A. Particularly good results as regards the lactone selectivity are obtained with 5 A-molecular sieves when the monovalent alkali metal ions in the commercial molecular sieves are additionally exchanged, by known exchange processes, for protons or divalent metal ions, preferably alkaline earth metal ions, for example calcium ions, or trivalent cations, for example the ions of the rare-earth metals. It is particularly advantageous for a selective thermolysis to exchange the alkali metal ions in stages with the help of diluted aqueous acids or diluted aqueous ammonia by intermittently heating the molecular sieves to temperatures within the range of from 500°C to 700°C, preferably 550°C to 650°C, and then continuing the ion exchange.

As anhydride of a β-acyloxypivalic acid the symmetric anhydride of β-acyloxypivalic acid or the mixed anhydride of a β-acyloxypivalic acid with a low aliphatic carboxylic acid is used. The anhydrides are subjected to thermolysis at a temperature within the range of from 150°C to 350°C in the presence of catalysts supported on carriers to obtain pivalolactone, in which process the corresponding symmetric or mixed acid anhydride is formed as a by-product from the acyloxy group or from the acyloxy group and the acid radical of the aliphatic carboxylic acid.

In the above formulae (1) and (2), $R^1$ and $R^2$ represent hydrogen or low alkyl groups with up to 5 carbon atoms, for example, methyl, ethyl, isopropyl, butyl and amyl. $R^1$ and $R^2$ are preferably identical. The following anhydrides may therefore be used for the thermolysis reaction: formoxypivalic anhydride, acetoxypivalic anhydride, propionoxypivalic anhydride or the mixed anhydride of acetic acid and acetoxypivalic acid. Acetoxypivalic anhydride is preferably used.

Particularly good results are obtained by reacting the anhydrides on the catalyst at a temperature of 250°C to 300°C. The anhydride may be evaporated directly in the liquid form or after dilution with an inert solvent, for example benzene or xylene, and then passed in the gaseous phase, either alone or with an inert gas, over the catalyst which is present in a fixed bed or fluidized by the evaporated starting products to yield a fluidized bed. It is also possible to pass the anhydride vapors into an inert high-boiling solvent in which the catalyst is present in a finely divided form.

The reaction may be carried out under atmospheric pressure. It is advantageous, however, to use a reduced pressure, preferably within the range of from 10 to 100 millimeters of mercury, although a reduced pressure outside this range may also be used. The reaction products are cooled and all condensable products are subjected to a fractional distillation. The pivalolactone formed is isolated and any parts of unreacted anhydride are returned to the reaction.

The pivalolactone so obtained constitutes an important monomer for the manufacture of polypivalolactone which is a polyester which may be used as thermoplast and for the manufacture of fibers.

The following Examples serve to illustrate the invention.

EXAMPLE 1

A crystalline aluminum silicate having a uniform pore size, a grain size of 0.1 to 0.3 millimeter and a ratio of $SiO_2$: $Al_2O_3$ of about 2, and which is commercially available as molecular sieve of type $x$, was washed at 80°C first with water and then with a 10% aqueous acetic acid, dried and calcined at 600°C for 3 hours. Then it was washed with a semiconcentrated aqueous ammonia solution, dried and calcined at 400°C for 3 hours. On 40 milliliters of this catalyst, 10.8 grams per hour of βacetoxypivalic anhydride were reacted at 275°C in a glass reactor under a pressure of 12 to 15 millimeters mercury, after having been passed through a pre-evaporator. The anhydride was quantitatively reacted. 92 mol % pivalolactone was found in the condensate. As by-product acetic anhydride was substantially formed besides small amounts of $CO_2$ and isobutylene. The pivalolactone could be isolated by distillation and thus be obtained in a pure form.

EXAMPLE 2

A crystalline aluminum silicate having a uniform pore size, a grain size of 0.1 to 0.3 millimeter and a ratio of $SiO_2$: $Al_2O_3$ of about 2, and which is commercially available as molecular sieve of type $x$, was washed with water and then treated with a semiconcentrated ammonium chloride solution at 80°C. The resulting ammonium form of the molecular sieve was washed and converted into the hydrogen form of the molecular sieve by calcination at 400°C. 40 milliliters of this catalyst were charged with 24.9 millimols per hour of preevaporated acetoxypivalic anhydride in a glass reactor at a temperature of 275°C under a pressure of 12 to 15 millimeters mercury. With a 100% conversion of the anhydride, 30.0 millimols pivalolactone, corresponding to a yield of 60.3%, were found by gas chromatography and isolated by distillation.

What we claim is:

1. A process for the manufacture of pivalolactone which comprises the step of thermally decomposing the anhydride of a β-acyloxypivalic acid of the formula (1)

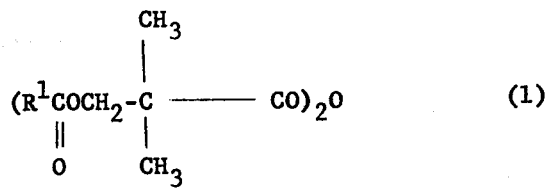

in which $R^1$ is hydrogen or an alkyl group with up to 5 carbon atoms, or the mixed anhydride of a β-acyloxypivalic acid and a lower aliphatic carboxylic acid of the formula (2)

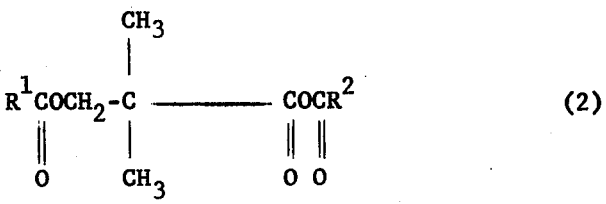

in which $R^1$ and $R^2$ have the meaning given above for $R^1$, at temperatures within the range of from 150°C. to 350°C. in the presence of a molecular sieve formed of a crystalline aluminum silicate of a uniform pore size, the alkali metal ions of which have been exchanged for protons or alkaline earth metal ions, said ion exchange having been carried out in two stages with intermittent heating of the molecular sieve to a temperature of 500°C. to 700°C.

2. The process of claim 1 wherein the reaction is carried out in the gaseous phase.

3. The process of claim 1 wherein a temperature within the range of from 250°C to 300°C is used.

4. The process of claim 1 wherein the reaction is carried out at a reduced pressure within the range of from 10 to 100 millimeters mercury.

5. The process of claim 1 wherein the ion exchange in the molecular sieve is carried out in two stages with intermittent heating of the molecular sieve to a temperature of 550°C. to 650°C.

* * * * *

UNITED STATES PATENT OFFICE
CERTIFICATE OF CORRECTION

PATENT NO : 3,883,562
DATED : May 13, 1975
INVENTOR(S) : Arpe et al.

It is certified that error appears in the above-identified patent and that said Letters Patent are hereby corrected as shown below:

In Item [30] of the Heading, the filing date of German Application P 1,923,703 should read -- May 9, 1969 --.

Signed and Sealed this twenty-second Day of July 1975

[SEAL]

Attest:

RUTH C. MASON
Attesting Officer

C. MARSHALL DANN
Commissioner of Patents and Trademarks